(12) United States Patent
Zhang et al.

(10) Patent No.: US 12,267,270 B2
(45) Date of Patent: Apr. 1, 2025

(54) SRS COLLISION HANDLING

(71) Applicant: APPLE INC., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Huaning Niu, San Jose, CA (US); Oghenekome Oteri, San Diego, CA (US); Sigen Ye, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,279

(22) PCT Filed: Sep. 24, 2021

(86) PCT No.: PCT/CN2021/120284
§ 371 (c)(1),
(2) Date: Aug. 30, 2022

(87) PCT Pub. No.: WO2023/044742
PCT Pub. Date: Mar. 30, 2023

(65) Prior Publication Data
US 2024/0195564 A1 Jun. 13, 2024

(51) Int. Cl.
*H04W 8/22* (2009.01)
*H04L 5/00* (2006.01)
*H04W 16/28* (2009.01)
*H04W 76/15* (2018.01)

(52) U.S. Cl.
CPC ............. *H04L 5/0051* (2013.01); *H04W 8/22* (2013.01); *H04W 16/28* (2013.01); *H04W 76/15* (2018.02)

(58) Field of Classification Search
CPC ...... H04L 5/0051; H04W 16/28; H04W 76/15
See application file for complete search history.

(56) References Cited

U.S. PATENT DOCUMENTS

| | | | |
|---|---|---|---|
| 12,041,012 B2* | 7/2024 | Manolakos | H04L 5/0094 |
| 2018/0006788 A1* | 1/2018 | Lee | H04L 5/001 |
| 2018/0183556 A1* | 6/2018 | Shin | H04L 5/00 |

(Continued)

FOREIGN PATENT DOCUMENTS

| | | |
|---|---|---|
| CN | 102149182 A | 8/2011 |
| CN | 109391447 A | 2/2019 |

(Continued)

OTHER PUBLICATIONS

PCT/CN2021/120284 , International Search Report and Written Opinion, Jan. 13, 2022, 9 pages.

*Primary Examiner* — Fahmida S Chowdhury
(74) *Attorney, Agent, or Firm* — Dorsey & Whitney LLP

(57) ABSTRACT

Apparatuses, systems, and methods for SRS collision handling. A wireless device may determine whether simultaneous transmission of at least two sounding reference signals (SRSs) is allowed; if it is determined that the simultaneous transmission of the at least two SRSs is allowed, transmit the at least two SRSs simultaneously; and if it is determined that the simultaneous transmission of the at least two SRSs is not allowed, transmit one SRS of the at least two SRSs, and drop the other SRS of the at least two SRSs.

17 Claims, 8 Drawing Sheets

(56) References Cited

U.S. PATENT DOCUMENTS

| | | | | |
|---|---|---|---|---|
| 2020/0374814 | A1* | 11/2020 | Gong | H04L 5/0023 |
| 2020/0382250 | A1* | 12/2020 | Choi | H04W 72/21 |
| 2021/0194737 | A1* | 6/2021 | Gao | H04W 72/53 |
| 2021/0336820 | A1* | 10/2021 | Lim | H04W 80/02 |
| 2021/0367727 | A1* | 11/2021 | Go | H04L 5/0048 |
| 2022/0200768 | A1* | 6/2022 | Go | H04W 72/23 |
| 2022/0271889 | A1* | 8/2022 | Matsumura | H04L 5/0042 |
| 2023/0079945 | A1* | 3/2023 | Manolakos | H04L 1/08 370/329 |
| 2023/0080106 | A1* | 3/2023 | Ji | H04L 5/0094 370/330 |
| 2023/0144253 | A1* | 5/2023 | Chen | H04W 72/1268 370/329 |
| 2023/0155770 | A1* | 5/2023 | Go | H04L 5/0044 370/329 |

FOREIGN PATENT DOCUMENTS

| | | |
|---|---|---|
| CN | 110943813 A | 3/2020 |
| CN | 113396554 A | 9/2021 |
| WO | 2020197335 A1 | 10/2020 |

* cited by examiner

SRS COLLISION HANDLING

TECHNICAL FIELD

This application relates generally to wireless communication systems, including apparatus, systems, and methods for SRS collision handling.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

SUMMARY

The present disclosure provides apparatuses, systems, and methods for sounding reference signal (SRS) collision handling.

Embodiments disclosed herein include a wireless device, comprising: at least one antenna; and a processor; wherein the wireless device is configured to: determine whether simultaneous transmission of at least two sounding reference signals (SRSs) is allowed; if it is determined that the simultaneous transmission of the at least two SRSs is allowed, transmit the at least two SRSs simultaneously; and if it is determined that the simultaneous transmission of the at least two SRSs is not allowed, transmit one SRS of the at least two SRSs, and drop the other SRS of the at least two SRSs.

Embodiments disclosed herein include a network device, comprising: at least one antenna; and a processor; wherein the network device is configured to: transmit a control signaling to a wireless device; and receive one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

Embodiments disclosed herein include a method performed by a wireless device, comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs.

Embodiments disclosed herein include a method performed by a network device, comprising: transmitting a control signaling to a wireless device; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

Embodiments disclosed herein include a non-transitory computer-readable storage medium, having instructions stored thereon, which, when executed by a processor, cause a wireless device to: determine whether simultaneous transmission of at least two sounding reference signals (SRSs) is allowed; if it is determined that the simultaneous transmission of the at least two SRSs is allowed, transmit the at least two SRSs simultaneously; and if it is determined that the simultaneous transmission of the at least two SRSs is not allowed, transmit one SRS of the at least two SRSs, and drop the other SRS of the at least two SRSs.

Embodiments disclosed herein include a non-transitory computer-readable storage medium, having instructions stored thereon, which, when executed by a processor, cause a network device to: transmit a control signaling to a wireless device; and receive one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

Embodiments disclosed herein include a computer program product, comprising instructions stored thereon, which, when executed by a processor, cause a wireless device to: determine whether simultaneous transmission of at least two sounding reference signals (SRSs) is allowed; if it is determined that the simultaneous transmission of the at least two SRSs is allowed, transmit the at least two SRSs simultaneously; and if it is determined that the simultaneous transmission of the at least two SRSs is not allowed, transmit one SRS of the at least two SRSs, and drop the other SRS of the at least two SRSs.

Embodiments disclosed herein include a computer program product, comprising instructions stored thereon, which, when executed by a processor, cause a network device to: transmit a control signaling to a wireless device; and receive one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
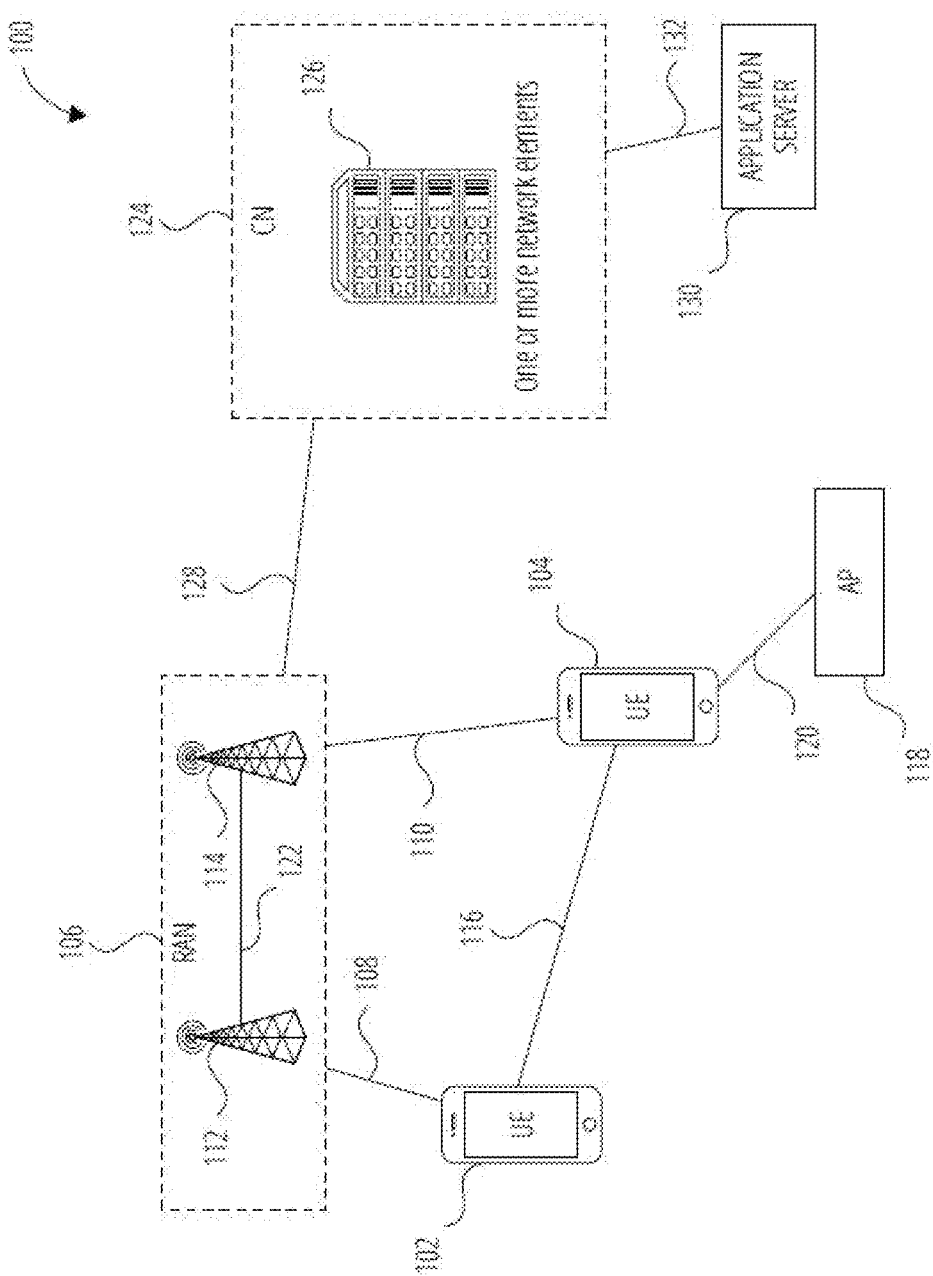
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB)

connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
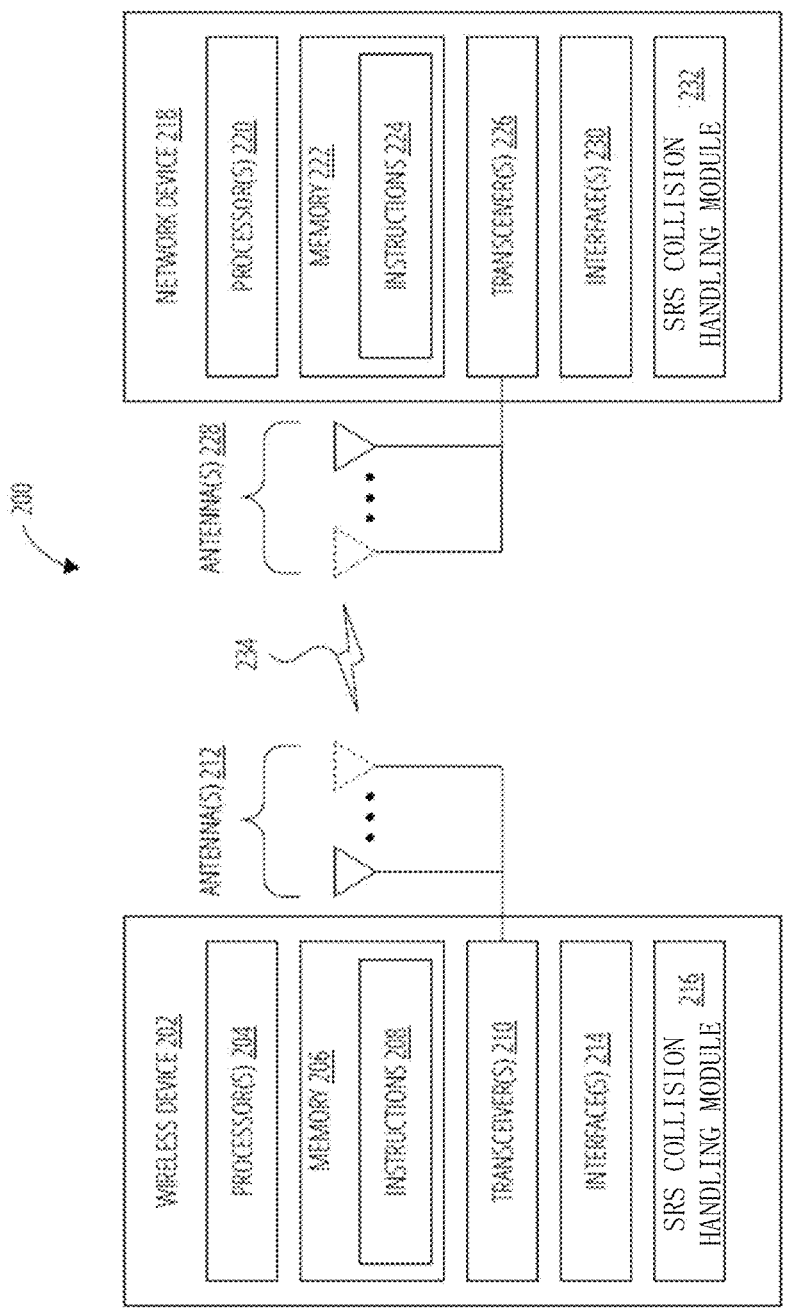
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The wireless device 202 may include a SRS collision handling module 216. The SRS collision handling module 216 may be implemented via hardware, software, or combinations thereof. For example, the SRS collision handling module 216 may be implemented as a processor, circuit, and/or instructions 208 stored in the memory 206 and executed by the processor(s) 204. In some examples, the SRS collision handling module 216 may be integrated within the processor(s) 204 and/or the transceiver(s) 210. For example, the SRS collision handling module 216 may be implemented by a combination of software components (e.g., executed by a DSP or a general processor) and hardware components (e.g., logic gates and circuitry) within the processor(s) 204 or the transceiver(s) 210.

The SRS collision handling module 216 may be used for various aspects of the present disclosure, for example, aspects of FIGS. 4 to 8. The SRS collision handling module 216 is configured to: determine whether simultaneous transmission of at least two sounding reference signals (SRSs) is allowed; if it is determined that the simultaneous transmission of the at least two SRSs is allowed, transmit the at least two SRSs simultaneously; and if it is determined that the simultaneous transmission of the at least two SRSs is not allowed, transmit one SRS of the at least two SRSs, and drop the other SRS of the at least two SRSs.

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

The network device 218 may include a SRS collision handling module 232. The SRS collision handling module 232 may be implemented via hardware, software, or combinations thereof. For example, the SRS collision handling module 232 may be implemented as a processor, circuit, and/or instructions 224 stored in the memory 222 and executed by the processor(s) 220. In some examples, the SRS collision handling module 232 may be integrated within the processor(s) 220 and/or the transceiver(s) 226. For example, the SRS collision handling module 232 may be implemented by a combination of software components (e.g., executed by a DSP or a general processor) and hardware components (e.g., logic gates and circuitry) within the processor(s) 220 or the transceiver(s) 226.

Figure 7:
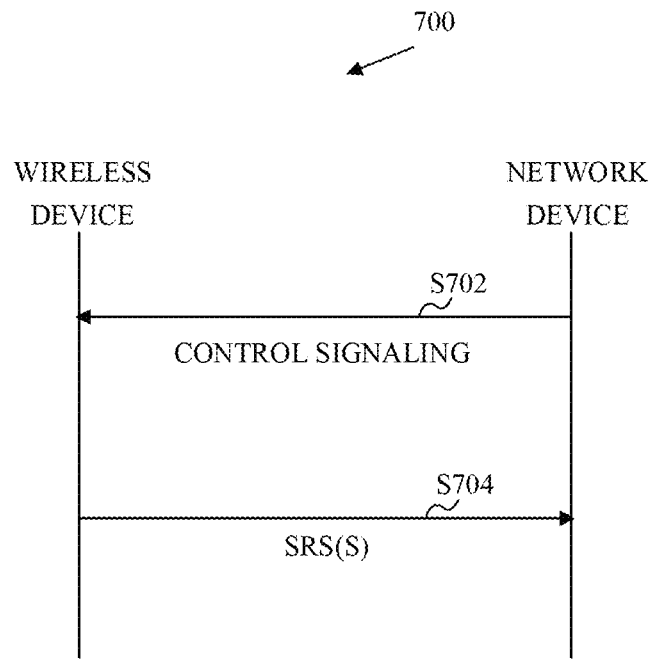
FIG. 7 illustrates an example communication procedure between a wireless device and a network device, according to embodiments disclosed herein.
Figure 8:
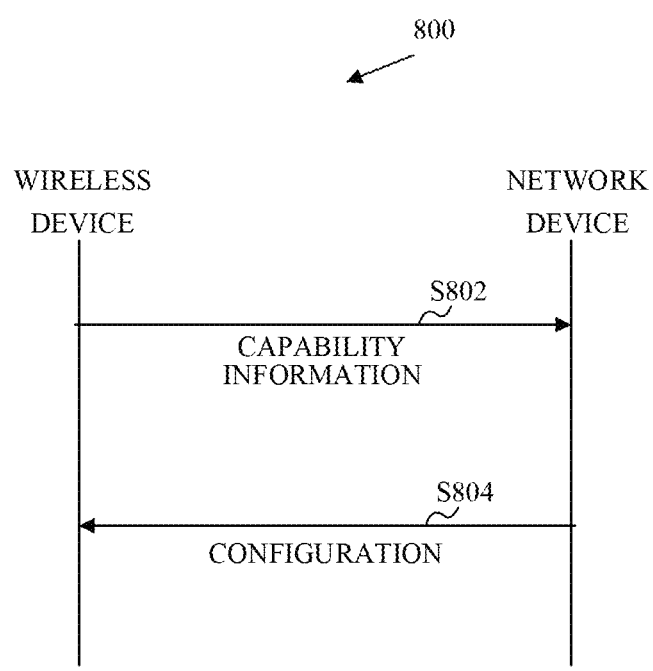
FIG. 8 illustrates an example communication procedure between a wireless device and a network device, according to embodiments disclosed herein.

The SRS collision handling module 232 may be used for various aspects of the present disclosure, for example, aspects of FIGS. 7 to 8. The SRS collision handling module 232 is configured to transmit a first control signaling to a wireless device; and receive one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

Figure 3:
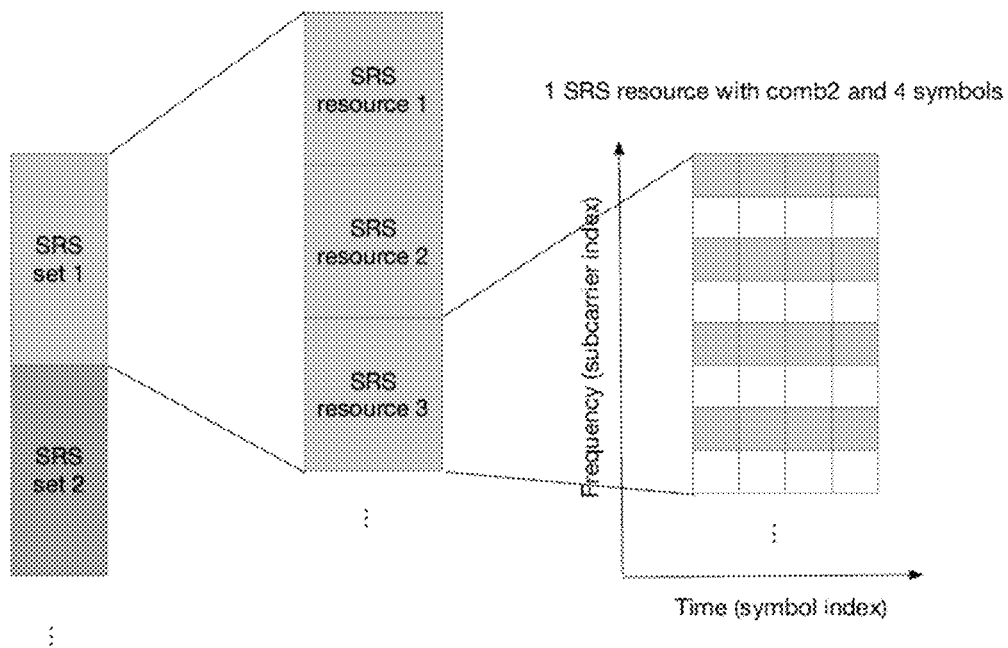
FIG. 3 illustrates an example structure of a SRS resource set, according to embodiments disclosed herein.

In Rel-15, a UE can be configured with multiple SRS resource sets with different usage, e.g. codebook (CB), non-codebook (NCB), beam management (BM) and antenna switching (AS). Each SRS resource set can include 1 or more than 1 SRS resources. Each SRS resource can be transmitted in 1, 2, or 4 symbols. In frequency domain, different comb structures (e.g., comb2 or comb4) can be used, which is configured by RRC signaling. If comb structure of comb2 is used, SRS is mapped to every two subcarriers in the frequency domain. If comb structure of comb4 is used, SRS is mapped to every four subcarriers in the frequency domain. FIG. 3 illustrates an example structure of a SRS resource set, according to embodiments disclosed herein. As shown in FIG. 3, SRS resource set 1 comprises SRS resources 1, 2 and 3. SRS resource 3 is configured with 4 symbols in the time domain and comb structure of comb2 in the frequency domain.

Regarding SRS for codebook (CB) or non-codebook (NCB), only 1 SRS resource set can be configured for a bandwidth part (BWP) in Rel-15. Regarding SRS for antenna switching (AS), the number of SRS resources should support xTyR behavior in Rel-15, where x indicates the number of ports for each SRS resource and y indicates the number of receiving antennas. The number of SRS resources for antenna switching (AS) should be equal to y/x. Regarding SRS for beam management (BM), UE can report the capability of maximum number of SRS resource sets it can support, and the base station will not configure more than the maximum number of SRS resource sets for UE. UE can support simultaneous transmission of SRS resources in different sets, where the time domain behavior for the SRS resource sets should be the same, i.e. periodic/semi-persistent/aperiodic, as defined in 38.214. As defined in 38.214, when the higher layer parameter usage is set to "beamManagement", only one SRS resource in each of multiple SRS resource sets may be transmitted at a given time instant, but the SRS resources in different SRS resource sets with the same time domain behaviour in the same BWP may be transmitted simultaneously.

For carrier aggregation (CA) mode, simultaneous transmission of a SRS for CB/NCB/BM and a SRS for CB/NCB/BM in different component carriers (CCs) is supported, while simultaneous transmission of a SRS for AS and a SRS for CB/NCB/BM/AS is subjected to UE capability.

In Rel-17, to support multi-TRP PUSCH transmission, in a BWP, 2 SRS resource sets for CB and 2 SRS resource sets for NCB are supported. Therefore, the following cases of SRS collision may occur:

Case 1: SRS from resource set 1 for CB+SRS for from resource set 2 for CB;

Case 2: SRS from resource set 3 for NCB+SRS for from resource set 4 for NCB;

Case 3: SRS from resource set 1&2&3&4 for CB/NCB+ other type of SRS.

The cases above can be for SRS within the same component carrier (CC) or in different CCs.

The simultaneous transmission of the two SRS resource sets for CB/NCB and other type of SRS (i.e., SRS collision) could be a problem. If simultaneous transmission is not supported, how to define the UE behavior when collision happens. If simultaneous transmission is supported, how to define the power scaling.

The present disclosure provides one or more solutions for solving SRS collision. However, the number of SRSs in SRS collision is not limited to 2, and there may be more than 2 SRSs in collision.

Figure 4:
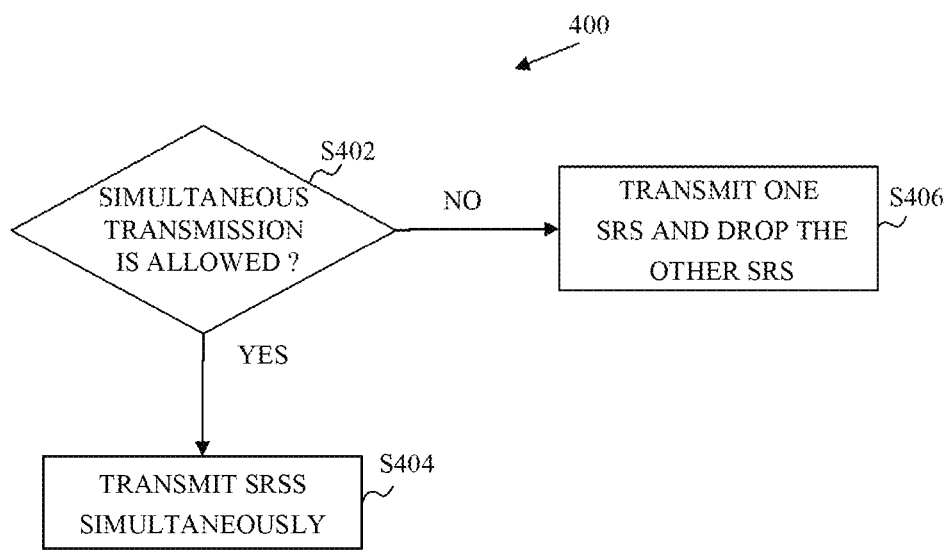
FIG. 4 illustrates an example procedure for SRS collision handling performed by a wireless device, according to embodiments disclosed herein.

FIG. 4 illustrates an example procedure 400 for SRS collision handling performed by a wireless device, according to embodiments disclosed herein. At step S402, the wireless device determines whether simultaneous transmission of at least two sounding reference signals (SRSs) is allowed. If it is determined that the simultaneous transmission of the at least two SRSs is allowed, the wireless device transmits the at least two SRSs simultaneously at step S404. If it is determined that the simultaneous transmission of the at least two SRSs is not allowed, the wireless device transmits one SRS of the at least two SRSs and drops the other SRS of the at least two SRSs at step S406.

In some embodiments of the present disclosure, the wireless device determines that the simultaneous transmission of the at least two SRSs is not allowed based on a scheduling restriction. The scheduling restriction indicates that simultaneous transmission of SRSs is not allowed.

In some embodiments of the present disclosure, the simultaneous transmission of the at least two SRSs is not allowed, and the wireless device determines priority of each of the at least two SRSs. The wireless device transmits the one SRS of the at least two SRSs with higher priority, and drops the other SRS of the at least two SRSs with lower priority.

Figure 5:
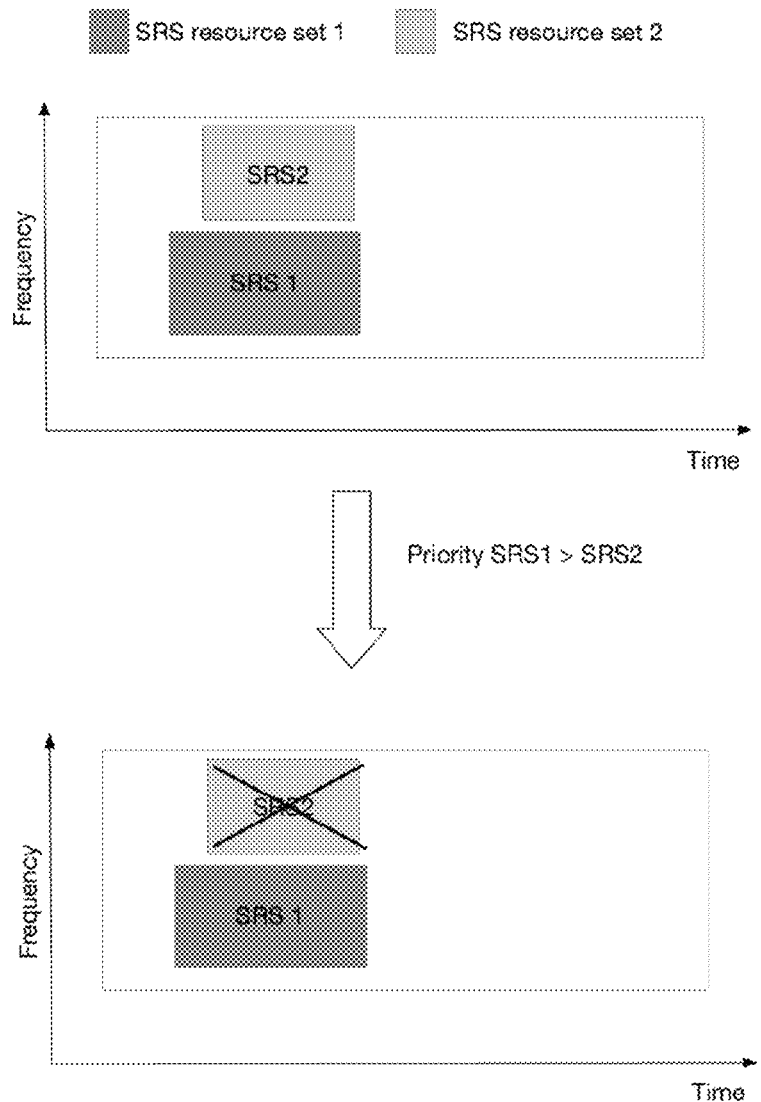
FIG. 5 illustrates example dropping of a SRS with lower priority, according to embodiments disclosed herein.

FIG. 5 illustrates example dropping of a SRS with lower priority, according to embodiments disclosed herein. In FIG. 5, the priority of SRS 1 is determined to be higher than the priority of SRS 2. Therefore, SRS 1 is transmitted and SRS 2 is dropped.

The priority can be determined by one or more of time domain behavior, usage, a SRS resource set ID/a SRS resource ID or a serving sell ID.

In some embodiments of the present disclosure, the priority is determined by time domain behavior of each of the at least two SRSs. The time domain behavior is selected from a group comprising at least aperiodic, semi-persistent and periodic. For example, priority of an aperiodic SRS is higher than priority of a semi-persistent SRS, and priority of a semi-persistent SRS is higher that a periodic SRS. i.e., aperiodic SRS>semi-persistent SRS>periodic SRS.

In some embodiments of the present disclosure, the priority is determined by usage/type of each of the at least two SRSs. The usage/type is selected from a group comprising at least codebook (CB), non-codebook (NCB), beam management (BM) and antenna switching (AS). For example, priority of a SRS for CB or NCB is higher than priority of a SRS for AS, and priority of a SRS for AS is higher that priority of a SRS for BM, i.e., SRS for CB/NCB>SRS for AS>SRS for BM.

In some embodiments of the present disclosure, the priority is determined by a SRS resource set ID or a SRS resource ID associated with each of the at least two SRSs. For example, priority of a SRS associated with a lower SRS resource set ID or a lower SRS resource ID is higher than priority of a SRS associated with a higher SRS resource set ID or a higher SRS resource ID, i.e., lower SRS resource set ID>higher SRS resource set ID and lower SRS resource ID>higher SRS resource ID.

In some embodiments of the present disclosure, the priority is determined by a serving sell ID associated with each of the at least two SRSs. For example, priority of a SRS associated with a lower serving sell ID is higher than priority of a SRS associated with a higher serving sell ID, i.e., lower serving sell ID>higher serving sell ID. In an example, the determination of priority based on the serving sell ID is applied to CA case.

SRS resources for the at least two SRSs may be partially overlapped. Therefore, all symbols or only overlapped symbols of a SRS may be dropped to avoid SRS collision. For example, the wireless device can drop all symbols or only overlapped symbols of the SRS with lower priority.

In some embodiments of the present disclosure, the wireless device receives a control signaling from a network device. The control signaling may indicate whether to drop all symbols or only overlapped symbols of a SRS if SRS resources for SRSs are partially overlapped. The control signaling may be a higher layer signaling, e.g. RRC.

In some embodiments of the present disclosure, the wireless device can determine whether to drop all symbols or only overlapped symbols of a SRS based on usage or type of the SRS. In one example, the wireless device drops all symbols of a SRS for AS/CB/NCB, since partial dropping may have impact on the channel estimation performance. In another example, the wireless device drops only overlapped symbols of a SRS for BM, since gNB may apply beam sweeping operation to receive different symbols, and gNB can still try some gNB beam based on the rest of symbols.

In some embodiments of the present disclosure, the wireless device configures SRSs for codebook (CB) and non-codebook (NCB) with different time domain behavior based on a scheduling restriction. The scheduling restriction may indicate that SRSs for codebook (CB) and non-codebook (NCB) should be configured with different time domain behavior. When collision happens, the priority can be determined by time domain behavior, e.g. aperiodic SRS>semi-persistent SRS>periodic SRS.

In some embodiments of the present disclosure, the simultaneous transmission of the at least two SRSs is allowed. However, total transmission power of the at least two SRSs may exceed maximum transmission power. If the total transmission power of the at least two SRSs exceeds the maximum transmission power, the wireless device scales transmission power of the at least two SRSs such that the total transmission power does not exceed the maximum transmission power.

In some embodiments of the present disclosure, the transmission power of each of the SRSs is scaled to a same transmission power. That is to say, the maximum transmission power is equally split for all SRSs. In an example, if the maximum transmission power is 23 dBm, SRS resource for each SRS of two SRSs can take up to 20 dBm.

In some embodiments of the present disclosure, the transmission power of each of the SRSs is scaled by a common scaling factor. In an example, the transmission power of resource element for SRS is scaled by Pcmax/Ptx_total, where Pcmax is the maximum transmission power and Ptx_total indicates total of the planned transmission power for the SRS resources based on uplink power control.

In some embodiments of the present disclosure, a priority rule can be introduced, where the wireless device only scales down the SRS with lower priority. The priority can be determined by one or more of time domain behavior of SRS, usage/type of SRS, SRS resource set ID/SRS resource ID, or serving cell ID (Only applicable for CA case). For time domain behavior of SRS, the priority is, e.g., aperiodic SRS>semi-persistent SRS>periodic SRS. For type or usage of SRS, the priority is, e.g., SRS for CB/NCB>SRS for AS>SRS for BM. For SRS resource set ID/SRS resource ID, the priority is, e.g., lower SRS resource set ID>higher SRS resource set ID or lower SRS resource ID>higher SRS resource ID. For serving cell ID, the priority is, e.g., lower serving cell ID>higher serving cell ID.

Figure 6A:
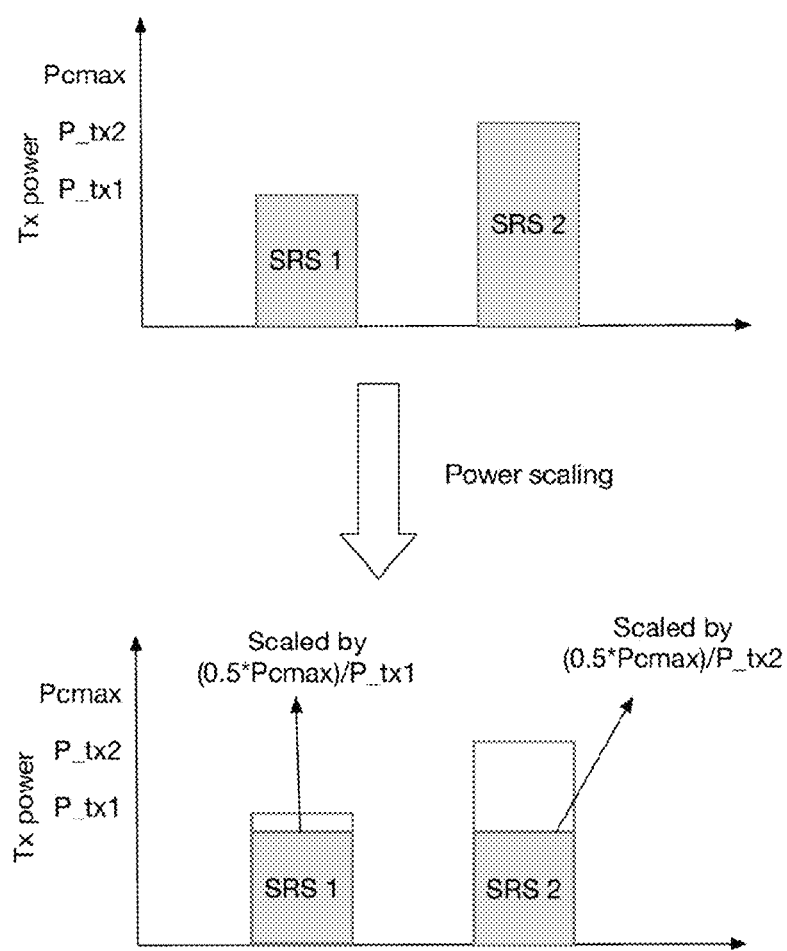
FIGS. 6A, 6B and 6C illustrates example power scaling of SRSs, according to embodiments disclosed herein.
Figure 6B:
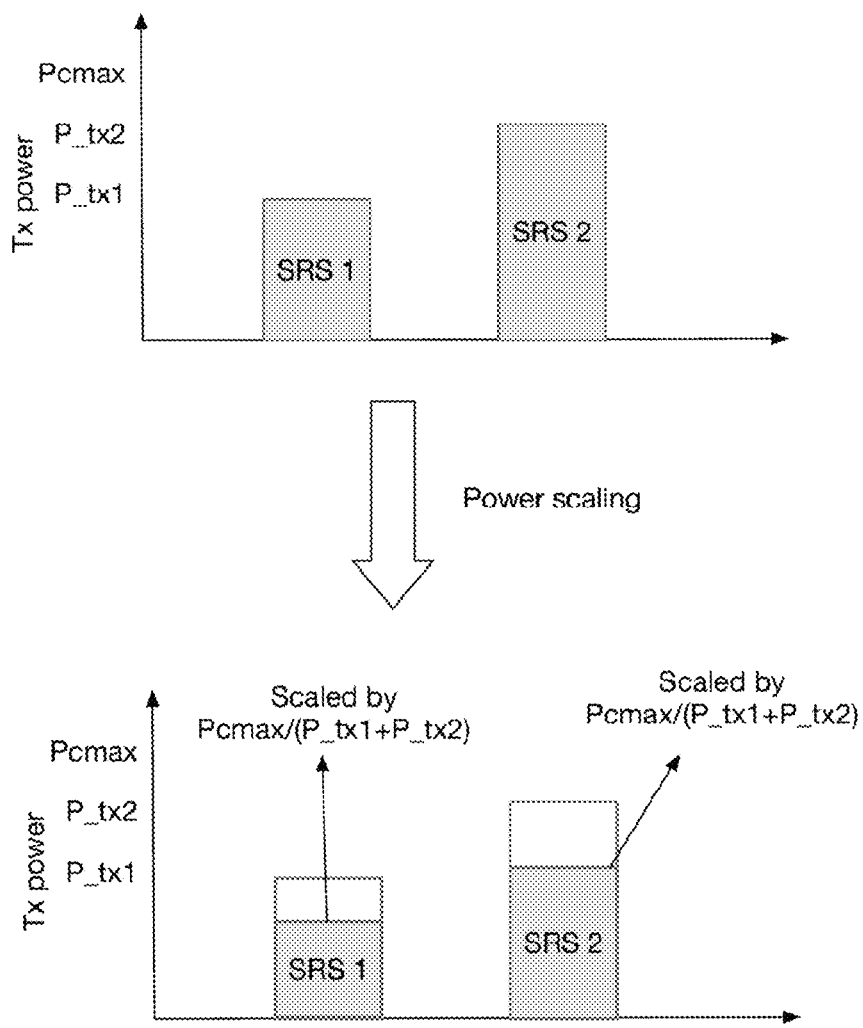
Figure 6C:
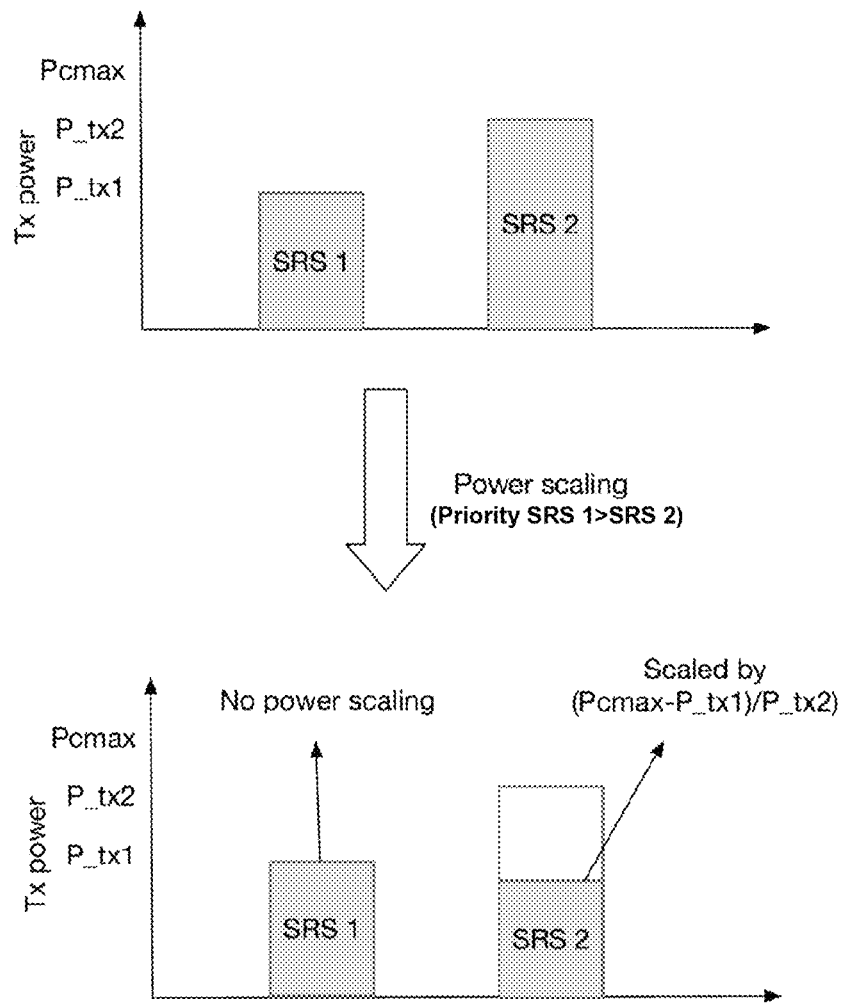

FIGS. 6A, 6B and 6C illustrates example power scaling of SRSs, according to embodiments disclosed herein. In those figures, Pcmax is the maximum transmission power, P_tx1 indicates the planned transmission power for SRS resource of SRS 1 based on uplink power control, and P_tx2 indicates the planned transmission power for SRS resource of SRS 2 based on uplink power control. In FIG. 6A, the transmission power of each of SRS 1 and SRS 2 is scaled to a same transmission power, i.e., 0.5*Pcmax. In FIG. 6B, the transmission power of each of the at least two SRSs is scaled by a common scaling factor, i.e., Pcmax/(P_tx1+P_tx2). In FIG. 6C, the transmission power of SRS 1 with higher priority is not scaled, while the transmission power of SRS 2 with lower priority is scaled by (Pcmax−P_tx1)/P_tx2.

In some embodiments of the present disclosure, the wireless device reports whether to support simultaneous transmission or not. For example, the wireless device transmits, to a network device, capability information of the wireless device on simultaneous transmission of SRSs for different cases separately. For example, the wireless device can report separate wireless device capabilities on simultaneous transmission of SRS in the same CC or different CCs within a band or band combination. The wireless device can also report the capability separately for different cases, e.g. case 1/2/3. For case 3, for antenna switching, the wireless device can report the simultaneous transmission of SRS for AS with other SRS(s) for configuration of xTyR (x<y) and xTxR separately. The wireless device may report whether it supports simultaneous transmission of the SRS resource sets for CB/NCB and other SRS.

In some embodiments of the present disclosure, the wireless device transmits, to a network device, capability information on the simultaneous transmission of the at least two SRSs via MAC control element (CE) or uplink control information (UCI). For example, the wireless device can report whether it can support simultaneous transmission for case 1/2/3 by MAC CE or UCI. For a wireless device that can support simultaneous multi-panel transmission, the wireless device may support simultaneous transmission of signals in different CCs from different panels. Since the panel may be changed during the communication, the wireless device may dynamically report whether some signals can be simultaneously transmitted by MAC CE or UCI. Alternatively, the simultaneous transmission can be determined by the panel entity index for the corresponding signal reported by the wireless device via MAC CE or UCI.

The network device can configure the wireless device based on the received capability information of the wireless device. For example, if simultaneous transmission is not allowed by the wireless device, the network device will not configure the wireless device with SRS resources for simultaneous transmission. If simultaneous transmission is allowed by the wireless device, the network device can configure the wireless device with SRS resources for simultaneous transmission.

In some embodiments of the present disclosure, the wireless device determines whether to support simultaneous transmission or not based on configuration of SRS. For example, the simultaneous transmission of the SRSs is allowed if one or more of the following configurations of the SRSs are the same: spatial relation; usage/type; or time domain behavior. In an example, whether SRS resources from two sets can be simultaneously transmitted are determined by the spatial relation configuration (e.g., beams). If spatial relation is not provided or the same spatial relation is provided, the two SRS resources can be simultaneously transmitted. In another example, whether SRS resources from two sets for CB/NCB can be simultaneously transmitted is determined by the usage/type of SRS. If usage/type for the two SRS resource sets are the same, the two SRS resource sets can be simultaneously transmitted. In yet another example, whether SRS resources from two SRS resource sets for CB/NCB can be simultaneously transmitted are determined by the time domain behavior of SRS. If time domain behavior for the two SRS resource sets are the same, the two SRS resource sets can be simultaneously transmitted. The spatial relation, usage/type and time domain behavior can be combined to define the simultaneous transmission based on multiple conditions.

FIG. 7 illustrates an example communication procedure 700 between a wireless device and a network device, according to embodiments disclosed herein. At step S702, the network device transmits a control signaling to the wireless device. The control signaling indicates whether to drop all symbols or only overlapped symbols of the other SRS of the at least two SRSs if SRS resources for the at least two SRSs are partially overlapped. At step S702, the wireless device transmits one SRS of the at least two SRSs, and drops the other SRS of the at least two SRSs according the control signaling.

FIG. 8 illustrates an example communication procedure 800 between a wireless device and a network device, according to embodiments disclosed herein. At step S802, the wireless device transmits capability information to the network device. The capability information may indicate whether or not simultaneous transmission of SRSs is allowed by the wireless device. At step S804, the network device configures the wireless device based on the received capability information. For example, if simultaneous transmission is not allowed by the wireless device, the network device will not configure the wireless device with SRS resources for simultaneous transmission. If simultaneous transmission is allowed by the wireless device, the network device can configure the wireless device with SRS resources for simultaneous transmission.

Embodiments contemplated herein include a wireless device, comprising: at least one antenna; and a processor; wherein the wireless device is configured to: determine whether simultaneous transmission of at least two sounding reference signals (SRSs) is allowed; if it is determined that the simultaneous transmission of the at least two SRSs is allowed, transmit the at least two SRSs simultaneously; and if it is determined that the simultaneous transmission of the at least two SRSs is not allowed, transmit one SRS of the at least two SRSs, and drop the other SRS of the at least two SRSs.

In some embodiments of the present disclosure, the wireless device is further configured to: determine that the simultaneous transmission of the at least two SRSs is not allowed based on a scheduling restriction.

In some embodiments of the present disclosure, the simultaneous transmission of the at least two SRSs is not allowed, and the wireless device is further configured to: determine priority of each of the at least two SRSs, wherein the one SRS of the at least two SRSs with higher priority is transmitted, and the other SRS of the at least two SRSs with lower priority is dropped.

In some embodiments of the present disclosure, the priority is determined by time domain behavior of each of the at least two SRSs, wherein the time domain behavior is selected from a group comprising at least aperiodic, semi-persistent and periodic, and wherein priority of an aperiodic SRS is higher than priority of a semi-persistent SRS, and priority of a semi-persistent SRS is higher that a periodic SRS.

In some embodiments of the present disclosure, the priority is determined by usage of each of the at least two SRSs, wherein the usage is selected from a group comprising at least codebook (CB), non-codebook (NCB), beam management (BM) and antenna switching (AS), wherein priority of a SRS for CB or NCB is higher than priority of a SRS for AS, and priority of a SRS for AS is higher that priority of a SRS for BM.

In some embodiments of the present disclosure, the priority is determined by a SRS resource set ID or a SRS resource ID associated with each of the at least two SRSs, wherein priority of a SRS associated with a lower SRS resource set ID or a lower SRS resource ID is higher than priority of a SRS associated with a higher SRS resource set ID or a higher SRS resource ID.

In some embodiments of the present disclosure, the priority is determined by a serving sell ID associated with each of the at least two SRSs, wherein priority of a SRS associated with a lower serving sell ID is higher than priority of a SRS associated with a higher serving sell ID.

In some embodiments of the present disclosure, all symbols of the SRS with lower priority are dropped if SRS resources for the at least two SRSs are partially overlapped.

In some embodiments of the present disclosure, only overlapped symbols of the SRS with lower priority are dropped if SRS resources for the at least two SRSs are partially overlapped.

In some embodiments of the present disclosure, the wireless device is further configured to: receive a control signaling from a network device, wherein the control signaling indicates whether to drop all symbols or only overlapped symbols of a SRS if SRS resources for SRSs are partially overlapped.

In some embodiments of the present disclosure, the SRS with lower priority is used for one of codebook (CB), non-codebook (NCB) and antenna switching (AS).

In some embodiments of the present disclosure, the SRS with lower priority is used for beam management (BM).

In some embodiments of the present disclosure, the wireless device is further configured to: configure SRSs for codebook (CB) and non-codebook (NCB) with different time domain behavior based on a scheduling restriction.

In some embodiments of the present disclosure, the simultaneous transmission of the at least two SRSs is allowed, and the wireless device is further configured to: if total transmission power of the at least two SRSs exceeds maximum transmission power, scale transmission power of the at least two SRSs such that the total transmission power does not exceed the maximum transmission power.

In some embodiments of the present disclosure, the transmission power of each of the at least two SRSs is scaled to a same transmission power.

In some embodiments of the present disclosure, the transmission power of each of the at least two SRSs is scaled by a common scaling factor.

In some embodiments of the present disclosure, the transmission power of a SRS of the at least two SRSs with lower priority is scaled down.

In some embodiments of the present disclosure, the wireless device is further configured to: transmit, to a network device, capability information of the wireless device on simultaneous transmission of SRSs for different cases separately.

In some embodiments of the present disclosure, the wireless device is further configured to: transmit, to a network device, capability information on the simultaneous transmission of the at least two SRSs via MAC control element (CE) or uplink control information (UCI).

In some embodiments of the present disclosure, the simultaneous transmission of the at least two SRSs is allowed if one or more of the following configurations of the at least two SRSs are the same: spatial relation; usage; or time domain behavior.

Embodiments contemplated herein include an apparatus comprising means to perform one or more elements of the method comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs. This apparatus may be, for example, an apparatus of a UE (such as a wireless device 202 that is a UE, as described herein).

Embodiments contemplated herein include a signal as described in or related to one or more elements of the method comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs.

Embodiments contemplated herein include a computer program or computer program product comprising instructions, wherein execution of the program by a processor is to cause the processor to carry out one or more elements of the method comprising: determining whether simultaneous transmission of at least two sounding reference signals (SRSs) is allowed; if it is determined that the simultaneous transmission of the at least two SRSs is allowed, transmitting the at least two SRSs simultaneously; and if it is determined that the simultaneous transmission of the at least two SRSs is not allowed, transmitting one SRS of the at least two SRSs, and dropping the other SRS of the at least two SRSs. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

Embodiments contemplated herein include a network device, comprising: at least one antenna; and a processor; wherein the network device is configured to: transmit a control signaling to a wireless device; and receive one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

In some embodiments of the present disclosure, the network device receives, from the wireless device, capability information of the wireless device on simultaneous transmission of SRSs for different cases separately.

Embodiments contemplated herein include an apparatus comprising means to perform one or more elements of the method comprising: transmitting a control signaling to a wireless device; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the method comprising: transmitting a control signaling to a wireless device; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the method comprising: transmitting a control signaling to a wireless device, wherein the scheduling restriction indicates that simultaneous transmission of sounding reference signals (SRSs) at the wireless device is not allowed; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the method comprising: transmitting a control signaling to a wireless device; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped. This apparatus may be, for example, an apparatus of a base station (such as a network device 218 that is a base station, as described herein).

Embodiments contemplated herein include a signal as described in or related to one or more elements of the method comprising: transmitting a control signaling to a wireless device; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped.

Embodiments contemplated herein include a computer program or computer program product comprising instructions, wherein execution of the program by a processing element is to cause the processing element to carry out one or more elements of the method comprising: transmitting a control signaling to a wireless device; and receiving one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped. The processor may be a processor of a base station (such as a processor(s) 220 of a network device 218 that is a base station, as described herein). These instructions may be, for example, located in the processor and/or on a memory of the UE (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A wireless device, comprising:
at least one antenna; and
a processor;
wherein the wireless device is configured to:
  determine whether simultaneous transmission of at least two sounding reference signals (SRSs) is allowed;
  if it is determined that the simultaneous transmission of the at least two SRSs is allowed, transmit the at least two SRSs simultaneously; and
  if it is determined that the simultaneous transmission of the at least two SRSs is not allowed:
    transmit one SRS of the at least two SRSs, and drop the other SRS of the at least two SRSs; and
    determine priority of each of the at least two SRSs, wherein the one SRS of the at least two SRSs with higher priority is transmitted, and the other SRS of the at least two SRSs with lower priority is dropped,
    wherein the priority is determined by usage of each of the at least two SRSs,
    wherein the usage is selected from a group comprising at least codebook (CB), non-codebook (NCB), beam management (BM) and antenna switching (AS), and
    wherein priority of a SRS for CB or NCB is higher than priority of a SRS for AS, and priority of a SRS for AS is higher that priority of a SRS for BM.

2. The wireless device of claim 1, wherein the wireless device is further configured to:
determine that the simultaneous transmission of the at least two SRSs is not allowed based on a scheduling restriction.

3. The wireless device of claim 1, wherein the priority is determined by time domain behavior of each of the at least two SRSs, wherein the time domain behavior is selected from a group comprising at least aperiodic, semi-persistent and periodic, and wherein priority of an aperiodic SRS is higher than priority of a semi-persistent SRS, and priority of a semi-persistent SRS is higher that a periodic SRS.

4. The wireless device of claim 1, wherein the priority is determined by a SRS resource set ID or a SRS resource ID associated with each of the at least two SRSs, wherein priority of a SRS associated with a lower SRS resource set ID or a lower SRS resource ID is higher than priority of a SRS associated with a higher SRS resource set ID or a higher SRS resource ID.

5. The wireless device of claim 1, wherein the priority is determined by a serving sell ID associated with each of the at least two SRSs, wherein priority of a SRS associated with a lower serving sell ID is higher than priority of a SRS associated with a higher serving sell ID.

6. The wireless device of claim 1, wherein all symbols of the SRS with lower priority are dropped if SRS resources for the at least two SRSs are partially overlapped.

7. The wireless device of claim 1, wherein only overlapped symbols of the SRS with lower priority are dropped if SRS resources for the at least two SRSs are partially overlapped.

8. The wireless device of claim 1, wherein the wireless device is further configured to:
receive a control signaling from a network device, wherein the control signaling indicates whether to drop all symbols or only overlapped symbols of a SRS if SRS resources for SRSs are partially overlapped.

9. The wireless device of claim 1, wherein the simultaneous transmission of the at least two SRSs is allowed, and the wireless device is further configured to:
- if total transmission power of the at least two SRSs exceeds maximum transmission power, scale transmission power of the at least two SRSs such that the total transmission power does not exceed the maximum transmission power.

10. The wireless device of claim 9, wherein the transmission power of each of the at least two SRSs is scaled to a same transmission power.

11. The wireless device of claim 9, wherein the transmission power of each of the at least two SRSs is scaled by a common scaling factor.

12. The wireless device of claim 9, wherein the transmission power of a SRS of the at least two SRSs with lower priority is scaled down.

13. The wireless device of claim 1, wherein the wireless device is further configured to:
- transmit, to a network device, capability information of the wireless device on simultaneous transmission of SRSs for different cases separately.

14. The wireless device of claim 1, wherein the wireless device is further configured to:
- transmit, to a network device, capability information on the simultaneous transmission of the at least two SRSs via MAC control element (CE) or uplink control information (UCI).

15. The wireless device of claim 1, wherein the simultaneous transmission of the at least two SRSs is allowed if one or more of the following configurations of the at least two SRSs are the same:
- spatial relation;
- usage; or
- time domain behavior.

16. A network device, comprising:
at least one antenna; and
a processor;
wherein the network device is configured to:
- transmit a control signaling to a wireless device;
- receive one SRS of at least two SRSs from the wireless device, wherein the other SRS of the at least two SRSs is dropped by the wireless device, wherein the control signaling indicates whether to drop all symbols or only overlapped symbols of the other SRS of the at least two SRSs if SRS resources for the at least two SRSs are partially overlapped; and
- receive, from the wireless device, capability information of the wireless device on simultaneous transmission of SRSs for different cases separately.

17. A method performed by a wireless device, comprising:
determining whether simultaneous transmission of at least two sounding reference signals (SRSs) is allowed;
if it is determined that the simultaneous transmission of the at least two SRSs is allowed, transmitting the at least two SRSs simultaneously; and
if it is determined that the simultaneous transmission of the at least two SRSs is not allowed:
- transmitting one SRS of the at least two SRSs, and dropping the other SRS of the at least two SRSs; and
- determining priority of each of the at least two SRSs, wherein the one SRS of the at least two SRSs with higher priority is transmitted, and the other SRS of the at least two SRSs with lower priority is dropped,
- wherein the priority is determined by usage of each of the at least two SRSs,
- wherein the usage is selected from a group comprising at least codebook (CB), non-codebook (NCB), beam management (BM) and antenna switching (AS), and
- wherein priority of a SRS for CB or NCB is higher than priority of a SRS for AS, and priority of a SRS for AS is higher that priority of a SRS for BM.

\* \* \* \* \*